United States Patent
Susi

[11] 3,723,427
[45] Mar. 27, 1973

[54] HINDERED TRIS(META-HYDROXYBENZYL)CYANURATE ANTIOXIDANTS

[75] Inventor: Peter Vincent Susi, Middlesex, N.J.

[73] Assignee: American Cyanamid Company, Stamford, Conn.

[22] Filed: Nov. 16, 1971

[21] Appl. No.: 199,340

[52] U.S. Cl. ......260/248 NS, 260/45.8, 252/51.5 R, 252/403, 99/163
[51] Int. Cl. ..............................C07d 55/38
[58] Field of Search.................260/248 NS

[56] References Cited

UNITED STATES PATENTS 3,531,483  9/1970  Gilles ..................................260/248

*Primary Examiner*—John M. Ford
*Attorney*—Philip Mintz

[57] ABSTRACT

Compounds of the formula:

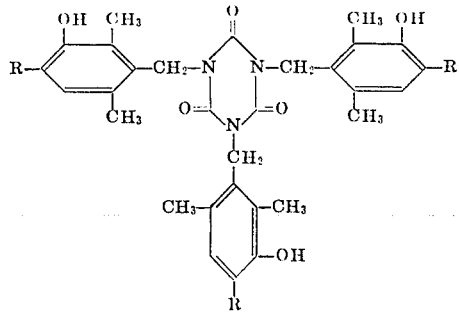

wherein R is a branched chain alkyl group containing three to about 12 carbon atoms are provided. These compounds are useful as antioxidants in organic substrates, such as polyolefins, rubber, etc. They can be prepared by reacting 3 moles of 4-alkyl-3-hydroxy-2,6-dimethylbenzyl chloride with 1 mole of cyanuric acid.

2 Claims, No Drawings

HINDERED TRIS(META-HYDROXYBENZYL)CYANURATE ANTIOXIDANTS

This invention relates to novel compounds useful for inhibiting oxidative degradation of organic materials. More particularly, it relates to compounds of the formula:

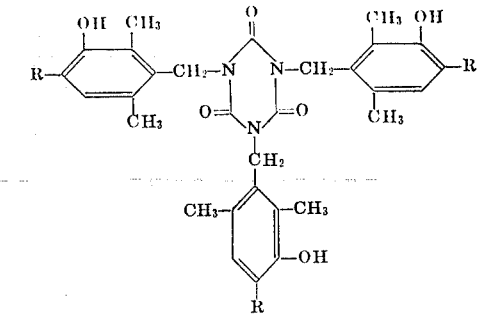

wherein R is a branched chain alkyl group containing three to about 12 carbon atoms. This invention also relates to the use of such compounds to inhibit oxidative degradation of organic materials subject thereto.

It is well known that numerous organic materials tend to deteriorate upon exposure to oxygen in air. Among such materials are polyolefins, ABS resins, polyamides, polyacetals, polystyrene, impact polystyrene, natural and synthetic rubbers including ethylene-propylene copolymers and carboxylated latices, fats, oils, greases, gasoline, etc. It is also well known to incorporate various additives (antioxidants) into such materials to inhibit oxidative degradation thereof. This invention arises out of the continuing search for new compounds which will be superior antioxidants for such materials.

The present invention is based on the discovery that these novel compounds, as defined in the above formula, in addition to inhibiting oxidation of organic materials, such as those mentioned above, possess outstanding resistance to extraction by boiling water, a property which has considerable importance when used in plastic materials in applications such as fibers, washing machine agitators, dish washer parts, and the like, where contact with hot water is likely. In addition, these compounds are useful processing antioxidants for polyolefins; that is, they protect the polymer against breakdown during milling, extrusion, and other high-temperature processing operations.

In the compounds of the present invention, the three nitrogens of the cyanuric acid are each connected to a hindered phenolic moiety through a methylene group. It will be noted that the hydroxyl group of each phenolic moiety is positioned meta with respect to the methylene group attaching the phenolic moiety to the cyanuric acid. It is critically important that this hydroxyl group be located in the meta position to avoid discoloration of the substrate in which these compounds are used and to provide a high degree of antioxidant protection to the substrate. It will also be noted that all positions ortho and para to the hydroxyl group are substituted, one ortho position with a branched chain alkyl group and the other two such positions with methyl groups. Thus, this phenolic moiety is hindered by the branched chain alkyl substituent adjacent to the hydroxyl group.

Illustrative of the branched chain alkyl groups represented by R in the position ortho to the phenolic hydroxy group in the compounds of this invention are isopropyl, t-butyl, secbutyl, t-amyl, sec-heptyl, sec-octyl, t-octyl, t-nonyl (1,1-dimethylheptyl), $\alpha,\alpha$-dimethylbenzyl, methylcyclopentyl, methyl cyclohexyl, and the like.

These compounds are readily prepared by known procedures, such as the reaction of one mole of cyanuric acid with three moles of an appropriate 4-alkyl-3-hydroxy-2,6-dimethylbenzyl chloride. The benzyl chloride utilized can be prepared from the corresponding 2,4-dimethyl-6-alkylphenol by introducing the chloromethyl group into the 3-position by reaction with hydrochloric acid and formaldehyde or by reaction with methylal in the presence of hydrochloric acid and sulfuric acid according to the procedure of R. Wegler and E. Regel, Makromol. Chem. 9, 1 (1952).

These compounds (1) are non-discoloring, (2) exhibit a high degree of antioxidant protection to the substrate, (3) are resistant to hot water extraction from the substrate, and (4) afford a high degree of stability to the substrate during mechanical processing, and are especially useful for inhibiting oxidative degradation of organic materials normally subject to deterioration upon exposure to oxygen, such as those mentioned above. These compounds may be incorporated into the various organic materials to be protected by any of the standard techniques, including stirring, milling, screw extruding, Banbury mixing, swelling, etc. These compounds are effective over a wide concentration range of about 0.01 to about 5.0 percent based on weight of material to be protected. In polypropylene, a preferred use, they are preferably used at a concentration between 0.05 and 1.0 percent based on weight of polyolefin. After incorporating these compounds into polymeric materials, during which other ingredients such as fillers, plasticizers, pigments, light absorbers, etc. may be added, the polymer composition is formed into useful shapes by molding, casting, spinning, extruding injection molding, or other shaping procedures. In polypropylene, the antioxidant activity of these compounds can be greatly enhanced by concurrent use therein of esters of thiodipropionic acid, such as dilauryl and distearyl thiodipropionate.

Oxidative deterioration of polypropylene and other similar oxidizable plastic materials is evident from the embrittlement which occurs on exposure to atmospheric oxygen. The extent to which the antioxidant protects against deterioration is measured in an accelerated test by determining the hours to embrittlement at 140°–150° C. when a specimen containing the antioxidant is exposed in a forced draft oven at this temperature.

Extractability of the antioxidant from the plastic by hot water is determined by refluxing compression molded films containing the antioxidant in water for a predetermined period of time and then aging the specimens in a forced-draft oven as described above.

The effectiveness of these compounds as processing antioxidants is determined by measuring the melt-index of the polymer containing the compound after repeated extrusions. The melt index is a measure of the melt viscosity which in turn is related to the molecular weight. An increase in the melt index on extrusion indicates a decrease in viscosity and a decrease in molecular weight (processing breakdown). A polymer blend of unstabilized polypropylene containing 0.1 percent of the compound and 0.25 percent distearylthiodipropionate (STDP) is extruded at 460° F. through a 3/4 inch extruder and pelletized. The pellets are reextruded for a total of four passes. The melt index of the pelletized polymer sample is measured after each pass, according to ASTM method D-1238. (STDP is normally incorporated into polypropylene to improve the long-term aging properties of phenolic antioxidants in general. The contribution of STDP to processing stability is minimal.)

The invention is more fully described in the following illustrative examples.

EXAMPLE 1

1,3,5-Tris(4-t-butyl-3-hydroxy-2,6-dimethylbenzyl)-s-triazine-2,4,6(1H, 3H, 5H)-trione

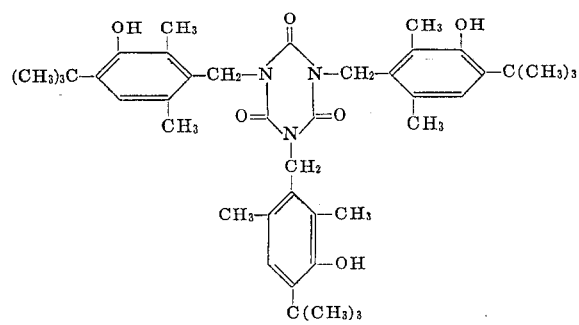

To a stirred mixture of 3.23 grams (0.025 mole) of cyanuric acid and 16.9 grams (0.075 mole) of 4-t-butyl-3-hydroxy2,6-dimethylbenzyl chloride in 50 ml. dimethylformamide at 40° C. was added dropwise 12 ml. (0.08 mole) of triethylamine. The reaction mixture was stirred for 18 hours; 50 ml. water and 50 ml. benzene were added and the two liquid layers separated. The benzene phase was washed twice with 50 ml. portions of water, the remaining water azeotropically removed, and the benzene solution clarified with 50 g. Superfiltrol. The benzene was removed and replaced with 50 ml. methanol. After decolorizing with 10 grams of activated charcoal and cooling there was obtained 12 grams (78 percent) of the above identified product, m.p. 150° C. Recrystallization from methanol gave an analytical sample melting at 154°–155° C.

Compounds prepared in a similar way include: 1,3,5-Tris(4-sec.butyl-3-hydroxy-2,6-dimethylbenzyl)-s-triazine-2,4,6(1H, 3H, 5H)trione; 1,3,5-Tris(4-isopropyl-3-hydroxy-2,6-dimethylbenzyl)-s-triazine-2,4,6(1H, 3H, 5H)trione; 1,3,5-Tris(4-tert. amyl-3-hydroxy-2,6-dimethylbenzyl)-s-triazine-2,4,6(1H, 3H, 5H)trione; 1,3,5-Tris(4-t.octyl-3-hydroxy-2,6-dimethylbenzyl)-s-triazine-2,4,6(1H, 3H, 5H)trione; 1,3,5,-Tris(4-tert.dodecyl-3-hydroxy2,6-dimethylbenzyl)-s-triazine-2,4,6(1H, 3H, 5H)trione, and the like.

EXAMPLE 2

Evaluation in Polypropylene

The compound of Example 1 was incorporated into Avisun unstabilized polypropylene at the designated concentration by milling at 170°–180° C. on a standard two-roll laboratory mill. The milled sample was compression-molded into films 15 mil in thickness. Similar films were prepared containing the closest prior art compound: 1,3,5-tris(3,5-di-t-butyl-4-hydroxybenzyl)-s-triazine-2,4,6(1H, 3H, 5H)trione, disclosed in U.S. Pat. No. 3,531,483, issued Sept. 29, 1970. This prior art compound, which will be identified as "control compound," has the structure:

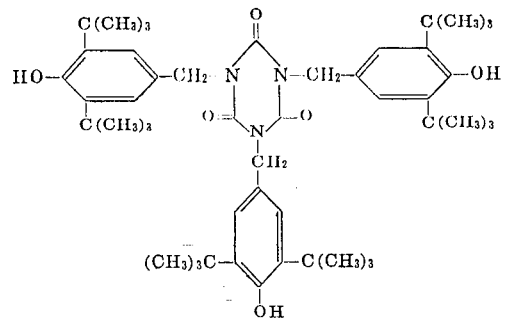

The films were aged in a forced-draft oven at 140° C. and the time (hours) to embrittlement recorded (Table I).

Compression molded films containing the antioxidants were refluxed in 200 ml. water for 7 hours (1 cycle). The water was replaced at the end of each cycle until 15 cycles (105 hours) of boiling water extractions were completed. The films were then aged as above at 150° C. in a forced-draft oven and hours to embrittlement noted (Table I). The oven-aged stability of the films after boiling water treatment is a measure of the extractability of the antioxidants.

Table I

| Additive (used at 0.2% concentration) | Compound Made in Example 1 | Control Comp. | No Add. |
|---|---|---|---|
| Oven-aging at 140°C Hours to Embrittlement | 970–980 | 360–370 | 4 |
| Oven-aging at 150°C after 15 cycles boiling water Hours to Embrittlement | 215–255 | 23–39 | |

This data shows that the compound of this invention is much superior in antioxidant activity as compared to the control compound. Of particular significance is the startling resistance to extraction by hot water, a most important property with respect to materials which are laundered or used immersed in water.

EXAMPLE 3

Processing Properties of Antioxidants in Polypropylene

Samples of unstabilized polypropylene containing 0.1 percent of the compound of Example 1 and 0.25 percent STDP were compared with samples containing 0.1 percent of the control compound of Example 2 and 0.25 percent STDP with respect to melt index as described herein above. The data are shown in Table II.

Table II

Melt Index (ASTM-D-1238)

| No. of Extrusions | Compound of Exam. 1 | Control Compound |
|---|---|---|
| 1 | 4.5 | 7.5 |
| 2 | 5.2 | 9.4 |
| 3 | 6.0 | 10.5 |
| 4 | 7.5 | 14.9 |

The data show that the melt index of polypropylene containing the compound of this invention increased only 3 units after 4 passes through the extruder whereas the control compound showed an increase of 7.4 units. This indicates that the compound of this invention is superior to the control compound in protecting polypropylene against polymer breakdown during processing.
I claim:
1. A compound of the formula:
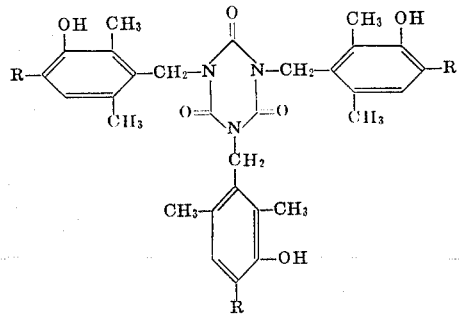
wherein R is a branched chain alkyl containing three to about twelve carbon atoms.
2. A compound as defined in claim 1 wherein R is tertiary butyl.
* * * * *